United States Patent
Adamson et al.

(10) Patent No.: US 7,472,203 B2
(45) Date of Patent: Dec. 30, 2008

(54) GLOBAL AND LOCAL COMMAND CIRCUITS FOR NETWORK DEVICES

(75) Inventors: Hugh P. Adamson, Boulder, CO (US); Scott Hesse, Longmont, CO (US)

(73) Assignee: Colorado Vnet, LLC, Loveland, CO (US)

( * ) Notice: Subject to any disclaimer, the term of this patent is extended or adjusted under 35 U.S.C. 154(b) by 926 days.

(21) Appl. No.: 10/631,599

(22) Filed: Jul. 30, 2003

(65) Prior Publication Data
US 2005/0044275 A1 Feb. 24, 2005

(51) Int. Cl.
*G06F 15/16* (2006.01)

(52) U.S. Cl. .................................... 709/253; 700/276
(58) Field of Classification Search ......... 709/220–222, 709/253, 223; 713/310; 700/275–276
See application file for complete search history.

(56) References Cited

U.S. PATENT DOCUMENTS

| | | | |
|---|---|---|---|
| 5,510,975 A | 4/1996 | Ziegler, Jr. | |
| 5,528,215 A | 6/1996 | Siu et al. | |
| 5,551,053 A | 8/1996 | Nadolski et al. | |
| 5,579,221 A | 11/1996 | Mun | |
| 5,621,662 A | 4/1997 | Humphries et al. | |
| 5,703,442 A | 12/1997 | Notohamiprodjo | |
| 5,784,547 A | 7/1998 | Dittmar et al. | |
| 5,938,757 A | 8/1999 | Bertsch | |
| 5,940,387 A | 8/1999 | Humpleman | |
| 6,038,500 A | 3/2000 | Weiss | |
| 6,192,282 B1 | 2/2001 | Smith et al. | |
| 6,199,136 B1 | 3/2001 | Shteyn | |
| 6,263,260 B1 | 7/2001 | Bodmer et al. | |
| 6,292,862 B1 | 9/2001 | Barrenscheen et al. | |
| 6,297,724 B1 | 10/2001 | Bryans et al. | |
| 6,336,128 B1 | 1/2002 | Eisenmann et al. | |
| 6,609,172 B1 | 8/2003 | Stringham | |
| 6,721,332 B1 * | 4/2004 | McAlear | 370/466 |
| 6,728,268 B1 | 4/2004 | Bird | |
| 2001/0005894 A1 * | 6/2001 | Fukui | 713/310 |
| 2003/0037171 A1 * | 2/2003 | Madineni et al. | 709/310 |

(Continued)

OTHER PUBLICATIONS

Luca Stagnaro, HurriCANe: VHDL CAN Controller core, Mar. 2000, Spacecraft Control and Data Systems Division, Automation and Information Dept, European Space Agency.

(Continued)

*Primary Examiner*—Salad Abdullahi
(74) *Attorney, Agent, or Firm*—Peter B. Scull; Berenbaum, Weinshienk & Eason

(57) ABSTRACT

Command system for a plurality of network devices. The command system may comprise a network administrator provided on a network, the network administrator issuing a command signal over the network. A plurality of device interfaces provided between the network and each of the network devices. Each of the plurality of device interfaces having: at least one input line to receive the command signal over the network; a transceiver operatively associated with the input line, the transceiver detecting the command signal on the input line; and at least one switching element provided between the transceiver and the network device, the at least one switching element establishing a link to the network device when the command signal is detected by the transceiver. The plurality of device interfaces delivering the command signal to the plurality of network devices.

10 Claims, 5 Drawing Sheets

U.S. PATENT DOCUMENTS

| | | | |
|---|---|---|---|
| 2003/0074511 A1 | 4/2003 | Kramer et al. | |
| 2004/0176877 A1 | 9/2004 | Hesse | |
| 2004/0255000 A1* | 12/2004 | Simionescu et al. | 709/208 |
| 2005/0266823 A1 | 12/2005 | Hesse | |
| 2006/0095146 A1 | 5/2006 | Hesse | |

OTHER PUBLICATIONS

Luca Stragnaro, CAN Controller for HurriCANe: VHDL Mar. 2000, Spacecraft Control and Data Systems Division, Automation and Information Dept., European Space Agency.

Luca Stagnaro, AMBA Interface for HurriCANe: VHDL IP, Mar. 2000, Spacecraft Control and Data Systems Division, Automation and Information Dept., European Space Agency.

Luca Stagnaro, "Hurricane IP Core Home Page", available on the internet at ftp://ftp.estec.esa.nl/pub/ws/wsd/CAN/can.htm.

Hans-Christian Reuss, "Extended Frame Format—A New Option of the CAN Protocol", 1992-1993.

F. Moraes, et al. "Using the CAN Protocol and Reconfigurable Computing Technology for Web-Based Smart House Automation." Integrated Circuits and Systems Design, 2001, 14th Symposium, Sep. 10-15, 2001, pp. 38-43.

"CAN Bus Megafunction" Solution Brief 22, dated Sep. 1997, ver. 1, Altera Corporation, San Jose, CA 95134, 3 pages.

"Building Automation" published to the Internet at http://www.can-cia.de/can/application/building, last modified Oct. 31, 2002, 1 page.

"CAN Remote Automation and Control with the AVR" published to the Internet at http://www.cs.unibo.it/~lanconel/projects.html, at least as early as Dec. 13, 2002, 1 page.

"CAN Remote Automation and Control with the AVR" published to the Internet at http://caraca.sourceforge.net/, at least as early as Dec. 13, 2002, pp. 2-6.

Ron Smith, "FAQ Page" and "Quick Reference For RS485, RS422, RS232, And RS423", 9 pages, available at www.rs485.com, FAQ Page updated Jul. 20, 2002.

* cited by examiner

US 7,472,203 B2

GLOBAL AND LOCAL COMMAND CIRCUITS FOR NETWORK DEVICES

FIELD OF THE INVENTION

The invention pertains generally to signaling devices on a network, and more specifically to global and local command circuits for network devices.

BACKGROUND OF THE INVENTION

The ability to control one or more devices in a building (e.g., lighting, heating, air conditioning, security systems) based on one or more parameters (e.g., time, temperature, user preference) is known as building automation. Building automation may be implemented in any of a number of different types of buildings, including homes, offices, restaurants, stores, theaters, and hotels, to name only a few.

Building automation systems operate by issuing commands to one or more devices over a network. For example, a user may press a key on a keypad to adjust the lighting in a room. The keypad may issue a corresponding command to one or more of the lighting circuits in the room to adjust the lighting.

At various times, each of the devices may need to be restarted or reset to operate properly (e.g., following a power failure). However, building automation systems may comprise a number of different types of devices, making it a time-consuming process to power down and restart each device.

SUMMARY OF THE INVENTION

An embodiment of a command system for a plurality of network devices may comprise a network administrator provided on a network. The network administrator issues a command signal over the network. A plurality of device interfaces provided between the network and each of the network devices. Each of the plurality of device interfaces has at least one input line to receive the command signal over the network; a transceiver operatively associated with the input line, the transceiver detecting the command signal on the input line; and at least one switching element provided between the transceiver and the network device, the at least one switching element establishing a link to the network device when the command signal is detected by the transceiver. The plurality of device interfaces deliver the command signal to the plurality of network devices to command each of the network devices.

An embodiment of a method for signaling a plurality of network devices with a command may comprise: issuing a command signal over the network; receiving the command signal at each of a plurality of device interfaces provided between the network and the plurality of network devices; establishing a link via the device interfaces to each of the network devices; and delivering the command signal to the plurality of network devices to command each of the network devices.

BRIEF DESCRIPTION OF THE DRAWINGS

Illustrative and presently preferred embodiments of the invention are shown in the drawings, in which.

DESCRIPTION OF THE PREFERRED EMBODIMENT

Figure 1:
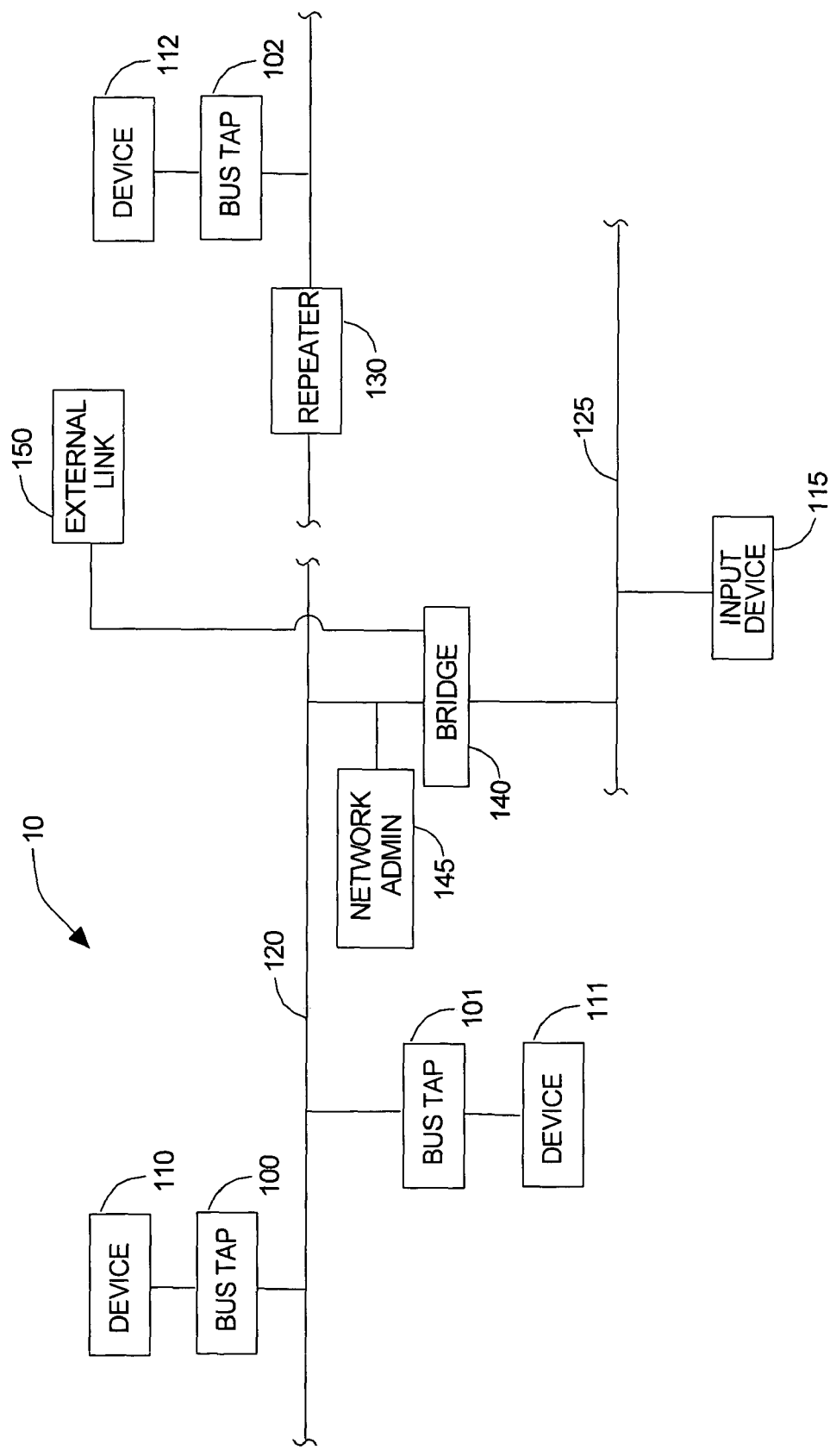
FIG. 1 is a high-level diagram illustrating one environment in which command system of the present invention may be used.

Systems and methods for signaling network devices with commands are shown and described herein with regard to a building automation environment 10, such as the one shown in FIG. 1. It should be understood that although the invention is described herein with particular references to reset signals, the systems and methods of the present invention may be used for signaling network devices for other purposes in addition to, or instead of resetting the devices.

The building automation environment 10 may be implemented in any of a number of different types of buildings, such as residences, offices, restaurants, stores, theaters, hotels; and/or grounds such as stadiums, parks, parking lots, and freight yards, to name only a few. However, it is understood that the teachings of the present invention are not limited to use in building automation environments and may be used in other network environments.

Building automation environment 10 may comprise any number of network devices 110 linked over network 120. Although additional network devices 111 and 112 are shown in FIG. 1 for purposes of illustration, the invention is not limited to use with any particular number of network devices.

Preferably, at least one of these devices is a control device or input device 115, such as a keypad. Input device 115 may be any suitable device for issuing a control signal to at least another device on one or more of the networks (e.g., 120, 125). By way of example, input devices 115 may comprise keypads, keyboards, graphical user interfaces (GUI), personal computers (PC), remote input devices, security sensors, temperature sensors, light sensors, and timers. Input device 115 may issue control signals to the network devices 110 either simultaneously (e.g., via broadcast) or independently (e.g., via point-to-point link) to control functions at the various network devices 110.

Various types of networks 120 may be provided according to the teachings of the invention. In one embodiment, network 120 comprises a controller area network (CAN) bus. Such a network for use in a building automation environment is described in more detail in co-pending, co-owned U.S. patent application Ser. No. 10/382,979, entitled "BUILDING AUTOMATION SYSTEM AND METHOD" of Hesse, et al., filed on Mar. 5, 2003, which is hereby incorporated herein by reference for all that it discloses.

Briefly, the CAN bus comprises a two-wire differential serial data bus. The CAN bus is capable of high-speed data transmission (about 1 Megabits per second (Mbits/s)) over a distance of about 40 meters (m), and can be extended to about 10,000 meters at transmission speeds of about 5 kilobits per second (kbits/s). It is also a robust bus and can be operated in noisy electrical environments while maintaining the integrity of the data.

The CAN specification is currently available as version 1.0 and 2.0 and is published by the International Standards Organization (ISO) as standards 11898 (high-speed) and 11519

(low-speed). The CAN specification defines communication services and protocols for the CAN bus, in particular, the physical layer and the data link layer for communication over the CAN bus. Bus arbitration and error management are also described. Of course the invention is not limited to any particular version and it is intended that other specifications for the CAN bus now known or later developed are also contemplated as being within the scope of the invention.

It is understood, however, that the present invention is not limited to use with the CAN bus and other types and/or configurations of networks are also contemplated as being within the scope of the invention. Other networks may also comprise an Ethernet or a wireless network (e.g., radio frequency (RF), BLUETOOTH™), to name only a few.

In addition, the network 120 may be extended, for example, using repeater 130. The network 120 may also comprise more than one network (e.g., 125), or subnets as they are sometimes referred to. By way of example, the network (e.g., 120) may comprise a plurality of CAN bus subnets, each linked to one another by an Ethernet network (e.g., 125). Bridging apparatus 140 may be provided to link the subnets to one another. Preferably devices on other networks (e.g., 125) can be operated to issue control signals to devices 110 on network 120 and vice versa.

A network administrator 145 may also be provided on the network 120, for example, embodied as a server computer or as part of bridge 140. Network administrator 145 may maintain a map identifying some or all of the devices 110 on the network 120. The map may be updated when new devices are added or when devices fail or are removed from the network. In addition, a device may request a network ID from the network administrator 145 (e.g., after it has been reset to its default setting). The network administrator may also comprise program code for monitoring each device for proper operation and diagnosing device problems and failures. Network administrator 145 may also be used to generate a global command signal, as will be discussed in more detail below.

Before continuing, it should be noted that the network 120 may also be provided with an optional link 150. Link 150 enables the devices 110 to be linked with other devices and/or systems, allowing the devices 110 to be controlled externally from the network 120. For example, outside security lighting at a residence may be controlled remotely by a homeowner using a thin-film transistor (TFT) display via an Ethernet network (e.g., 125) in the living room, or warehouse lighting may be controlled via a web page on the internet by the utility company.

In one embodiment, link 150 may comprise an external link from another network such as the Internet through an Internet service provider (ISP). In another embodiment, link 150 may comprise a link at another device on the same network (e.g., bridge 140 or server computer). Link 150 may be used to access devices 110 during installation or to configure or reconfigure one or more of the devices 110 at a later time (e.g., remotely).

Of course, it is understood that the link 150 is not limited to an ISP link. In other embodiments, the link 150 may be via a local area network (LAN), a wide area network (WAN), an Intranet, a telephony link, a digital subscriber line (DSL), T-1 connection, cellular link, satellite link, etc. In addition, link 150 may connect to any suitable external device, such as to a laptop computer, personal digital assistant (PDA), pager, facsimile machine, or mobile phone, to name only a few. In addition, link 150 may comprise a temporary connection for use by a service technician or the user. For example, the link 150 may comprise a link for connecting a laptop computer to the network 120.

The foregoing description is provided in order to better understand one environment in which the present invention may be used. However, it should be understood that the present invention may be used in a wide variety of building automation environments 10 and in conjunction with any of a wide range of other types and configurations of networks 120, now known or that may be developed in the future.

It is also noted that various types of devices may be provided on the network 120. These devices may be control devices, controlled devices, or combination control/controlled devices. By way of example, one or more of the devices 110 may comprise load control system for incandescent lighting described in co-pending, co-owned U.S. patent application entitled "LOAD CONTROL SYSTEM AND METHOD" of Adamson, et al., filed on Apr. 28, 2003 (Ser. No. 10/424,345), which is hereby incorporated herein by reference for all that it discloses. As another example, one or more of the devices 110 may comprise control system for gas discharge lamps described in co-pending, co-owned U.S. patent application entitled "CONTROL SYSTEMS AND METHODS" of Adamson, et al., filed on the same date as the present patent application (Attorney Docket No. CVN US-8; Serial No. Not Yet Accorded). As a further example, a monitoring system (e.g., a photodetector) may be used to provide feedback to one or more of the other devices 110. However, the invention is not limited to use with any particular types of devices 110.

Devices 110 may be operatively associated with the network 120 in any suitable manner, including by permanent, removable, or remote link. By way of example, devices 110 may be permanently linked to the network 120 by a hard-wire connection. Alternatively, devices 110 may be removably linked to the network 120 by a "plug-type" connection. Devices 110 may also be remotely linked to the network 120, for example via an RF link.

Preferably, devices 110 are linked to the network 120 via network interface or bus tap 100. It is understood that bus tap 100 need not be a separate device and can be integral with the network device 110 itself. In one exemplary embodiment, the bus tap 100 converts CAN signals received over the network 120 to Transistor Transistor Logic (TTL) signals for use by devices 110. TTL signals issued by devices 110 are similarly converted into CAN signals for transmission over the CAN bus (e.g., to other devices 110).

Figure 2:
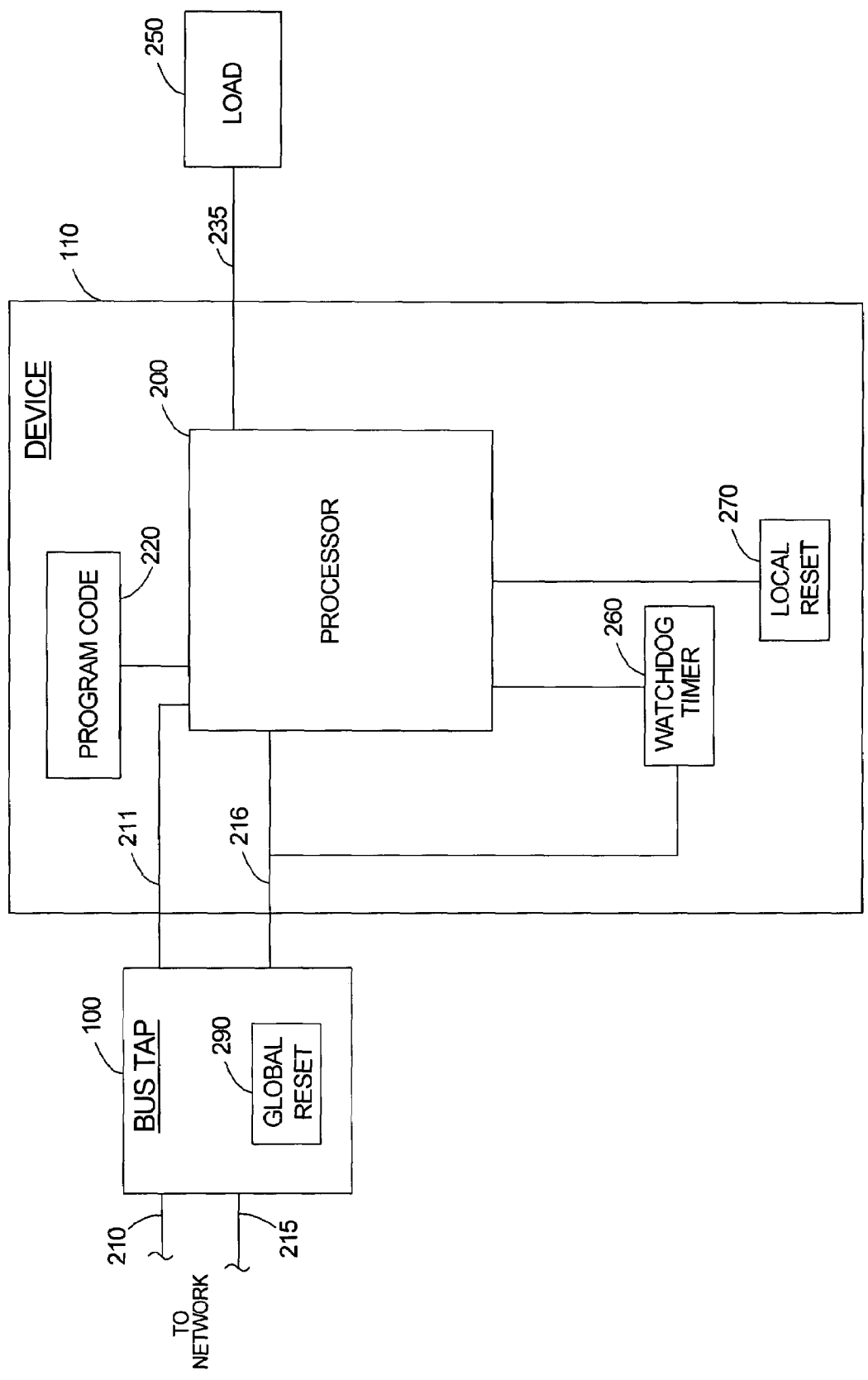
FIG. 2 is a functional diagram of a network interface and network device.

Processing circuitry may be provided for device 110 and is shown according to one embodiment of the invention in FIG. 2. According to this embodiment, power may be provided over line(s) 215, 216 and data may be transmitted over line(s) 210, 211.

Device 110 may comprise a processor 200 operatively associated with bus tap 100. Processor 200 may comprise any conventionally available or later developed microprocessor. By way of example, processor 200 may comprise a PIC® microcontroller available from Microchip Technology, Inc. (Chandler, Ariz. 85224). Other suitable processors may comprise programmable logic devices such as field programmable gate arrays (FPGA) or application-specific integrated circuits (ASIC), to name only a few.

Preferably, processor 200 is provided with program code 220. Processor 200 accesses the program code 220 and generates output (e.g., over line 235) based on data received over line 211. The output generated at the processor 200 may be used to perform one or more functions, such as controlling or driving a load 250 operatively associated with the device 110. For example, processor 200 may execute the program code 220 to control a load 250 (e.g., adjusting the intensity of a light circuit) operatively associated with the network device 110 based on data received via the network 120 from another of the network devices (e.g., keypad 115).

According to one embodiment, program code 220 may comprise scripts. Scripts are computer-readable program code optimized for programmer efficiency (e.g., it is relatively easy to write, flexible, and readily modified). Scripts are preferably independent of the type of processor and/or operating system and are therefore portable to a variety of different environments. Among other advantages, scripts may also comprise predefined, high-level routines, such as string manipulation operators, regular expressions, and associative arrays.

Embodiments for controlling a device using scripts is described in co-pending, co-owned U.S. patent application entitled "DISTRIBUTED CONTROL SYSTEMS AND METHODS FOR BUILDING AUTOMATION" of Hesse, et al., filed on Apr. 24, 2003 (Ser. No. 10/422,525), which is hereby incorporated herein by reference for all that it discloses. The scripts may be defined based on various parameters, such as the needs and desires of the building occupant. The scripts can also be reconfigured based on the changing needs and/or desires of the building occupants.

It is to be understood, however, that the present invention is not limited to use with scripts. Any suitable program code may be provided for processor 200. Other exemplary embodiments of program code 220 may comprise firmware, compiled languages, object-oriented programming languages, to name only a few.

In one embodiment, device 110 may comprise a watchdog timer 260 operatively associated with the processor 200. Watchdog timer 260 may be used to indicate the status of the processor 200 (e.g., to a user). For example, watchdog timer 260 may light LEDs to indicate the status of processor 200 (e.g., Blue=No Problems; Yellow=Potential or Readily Correctable Problem; and Red=Failure).

An embodiment of watchdog timer 260 is described in more detail with reference to the circuit diagram of FIG. 3. During normal operation, processor 200 delivers an output signal to the blue LED in LED bank 340. Resistors 312, 313, and 314 may be provided to limit current through the LEDs. Of course, these resistors can be selected to produce various light intensities for the LEDs during operation.

Output from D flip flops 305, 310, 320, 330 causes the blue LED to toggle (e.g., greater than one flash per second). That is, output from flip flop 320 is high at Q (and thus low at Q bar), causing the capacitor 355 to discharge through diode 343.

Before continuing, it is noted that switching elements (e.g., FETs) 350, 351, and 352 may be provided to control the LED bank 340. It is also noted that capacitor 306 and resistor 303 may be provided to reduce static input in flip flop 305 and maintain a low signal at pin 6. Diode 343 and capacitor 351 may be provided to maintain a low signal on pin 1 and prevent the watchdog timer from being triggered during normal operation.

Resistors 341, diode 342, and capacitor 352 may be provided as a "one shot." That is, when the clock on flip flop 320 is high, pin 1 goes up and then off and continues to discharge capacitor 351. When pin 13 on flip flop 330 is low, diode 333 and resistor 321 are low, thus preventing any signals from reaching the clock on flip flop 320. This helps to ensure that when flip flop 330 activates, the watchdog timer is off (i.e., no problems) and has to be reset by hitting the set pin on flip flop 320. In addition, resistor 356 and capacitor 357 may be provided to help ensure that flip flop 330 of the watchdog timer 260 starts in the correct sequence when power is restored after a reset condition. That is, when power is restored, capacitor 357 discharges, then after a short time, pin 8 on flip flop 330 goes high and sets the initial state of flip flop 330 so that the watchdog timer 260 is not activated at start up.

The tri-color LED bank 340 allows the processor to generate any color output signal. For example, if an error is detected, the processor 200 may generate a yellow signal using LED bank 340.

When the processor 200 fails to operate, there is no signal to the blue LED. If the processor fails, it no longer toggles the blue LED, and pin 3 on flip flop 320 is not toggled. Capacitor 355 charges and the watchdog timer 260 will take over. That is, the watchdog timer is on, and output from flip flop 330 is low at Q (and thus high at Q bar). Output form flip flop 330 at Q is connected to diode 333, which pulls the clock low and locks the flip flop 330. Output from Q bar is connected to the red LED, which turns on when the output goes high. This condition preferably requires user intervention (e.g., manually operating switch 300) and/or power cycling.

When the processor 200 fails, the circuit has no knowledge of the processor's state when it failed (e.g., high or low). Resistor 311 may be provided to help ensure that when FET 350 is turned off (i.e., the processor is no longer toggling the blue LED), the line to the drain on FET 350 through resistor 321 to pin 3 of flip flop 320 goes high. Resistors 318, 319 and diode 324 may be provided to overpower the processor and isolate any effect the processor 200 might have on the LED bank 340. The processor 200 no longer signals the LED bank 340 and the watchdog timer can activate the warning light (e.g., the red LED). Resistors 321, 322, 323 and diodes 331 and 332 may also be provided to disable the processor 200 from signaling the LED bank 340 during a failure condition.

If processor 200 is operating normally, the blue LED lights again indicating that the problem has been corrected. If processor 200 fails again, capacitor 355 discharges and is not recharged. The red LED lights again indicating that the problem has not been corrected.

Device 110 may also comprise a local command feature. Local command feature may be used, for example, to reset the processor 200, among other functions. In one exemplary embodiment, local command feature comprises a dual-mode command feature. In an examplary embodiment, command circuit 270 can restart the processor 200 by activating the master clear and restarting the processor 200. If the switch 300 is held closed for a longer time than the time-out of flip flop 310, the processor 200 will return to the default settings by sensing the I/O line. The processor 200 may be automatically reset (e.g., based on a time-out condition) or manually reset by the user (e.g., by pressing a button).

Figure 3:
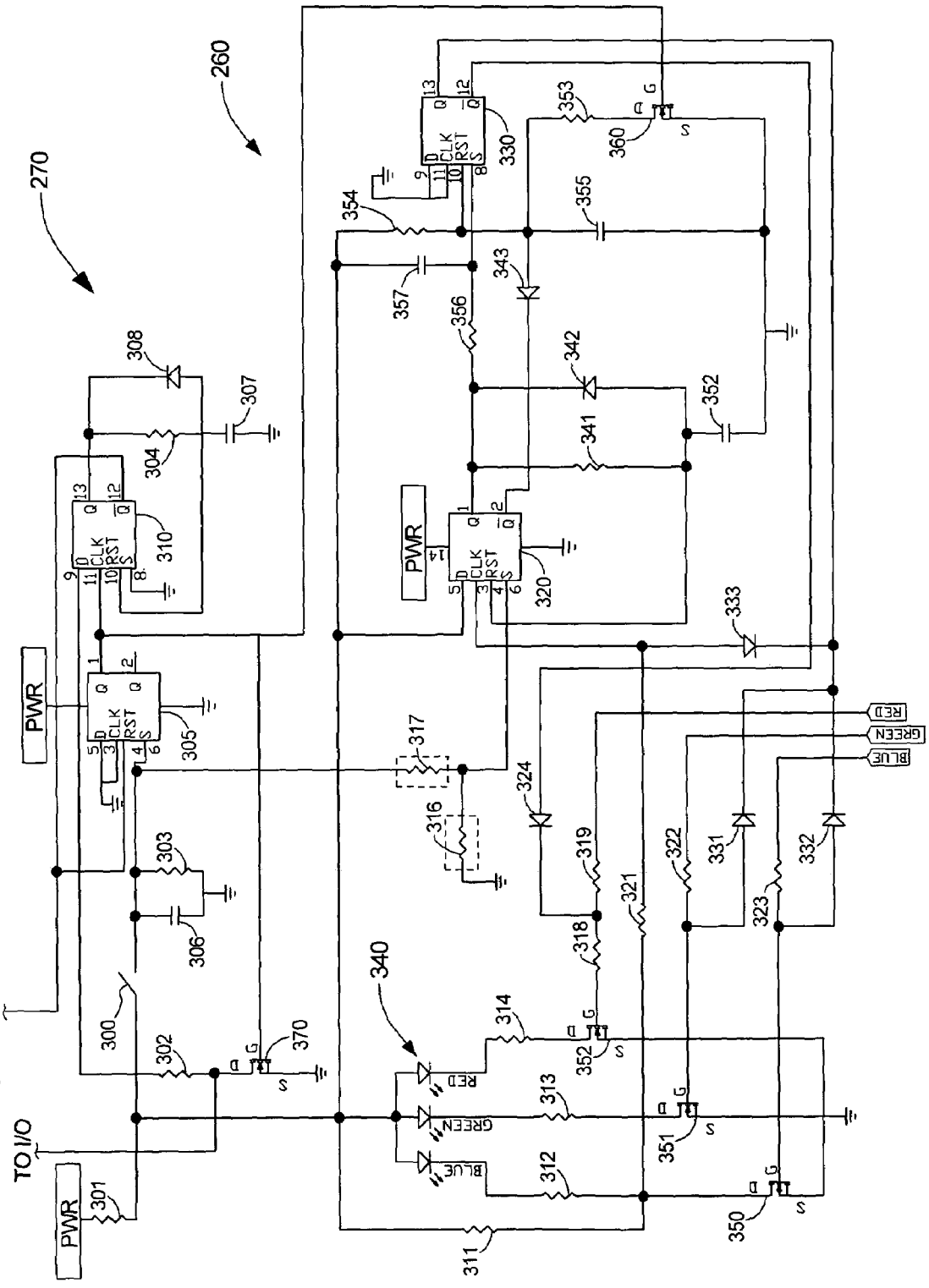
FIG. 3 is a circuit diagram showing one embodiment of local command and watchdog timer circuits for use with the network devices.

An embodiment of command circuit 270 is shown in the circuit diagram of FIG. 3. Command circuit 270 may be operatively associated with program code (e.g., firmware) provided at the processor 200 to signal the processor 200 based on the signals issued by the command circuit 270.

If switch 300 is closed and then opened (e.g., a button is pressed and released), a signal is issued over the processor line to signal the processor 200. That is, when switch 300 is closed, the set pin of flip flop 305 is energized (positive). Output from flip flop 305 at Q goes high and stays high when the set is positive. When output from flip flop 305 at Q goes high, it hits the clock on flip flop 310. The gate of FET 370 is pulled up, and the drain is pulled down. A drain resistor 302 may be provided to limit current in FET 370. Diode 308 is back biased and capacitor 307 charges through resistor 304. Output from flip flop 310 at Q bar goes low, signaling the processor 200 (e.g., to reset) via the processor line.

If switch 300 is closed and held closed for a short period of time (e.g., a button is pressed and held for several seconds), the signal issued may cause both the processor to reset and default to its original settings. Of course the signal issued can perform other functions. By way of example, these functions may comprise running a diagnostics program and displaying diagnostic information, to name only a few such functions.

When the switch 300 is closed, output of flip flop 305 at Q is high, which turns on FET 360 and fully discharges capacitor 351 through resistor 353. Accordingly, the watchdog timer will start in the correct state. That is, pin 6 of flip flop 320 is reset and capacitor 351 is fully discharged so that the processor 200 has time to start operating again.

In one embodiment, the device 110 can be reset without power cycling. The local command circuit may comprise resistor 317 (and not resistor 316). That is, when switch 300 is closed (e.g., a button is pushed), the processor 200 can be reset without being powered down. Such an embodiment may be used for an RF module which may experience a temporary failure due to noise and does not need to be powered down and restarted to effectively be reset.

In an alternative embodiment, resistor 316 is provided and resistor 317 is not present. Resistor 316 prevents the watchdog timer 260 from being reset using switch 300. Accordingly, to reset the device 110, the device 110 must be powered down or power cycled. Such an embodiment may be used for devices in which a microprocessor failure is indicative of a bigger problem (e.g., overheating) that should be addressed (e.g., the module needs replacing).

Watchdog timer 260 and command circuit 270 are preferably provided external to the processor 200 and are therefore unaffected by failure of the processor itself.

Bus tap 100 may also be provided with global command feature that may be used to signal one or more of the devices 110 on network 120 with a command. An exemplary embodiment of a global command circuit 400 that may be provided for bus tap 100 is shown in more detail in FIG. 4.

According to this embodiment, global command circuit 400 may comprise network connectors 400, 405 for linking the bus tap to the network 120. For example, network connectors 400, 405 may be insulation displacement contact (IDC) 8 pin connectors that are readily commercially available in the computer and electronics industry.

Network connectors 400, 405 serve as a pass through connection. That is, data can be received over the network 120 from either of the network connectors 400, 405 without breaking or terminating the network connection and other devices may be linked on the network 120 downstream from the bus tap 100. Data signals may be provided to the bus tap 100 via network 120 at pins 3 and 4 of network connectors 400, 405.

Of course it is understood that the invention is not limited to the network connection shown and described herein. Other embodiments suitable for use with the bus tap 100 will also become apparent to those skilled in the art after having become familiar with the teachings of the present invention.

Figure 4:
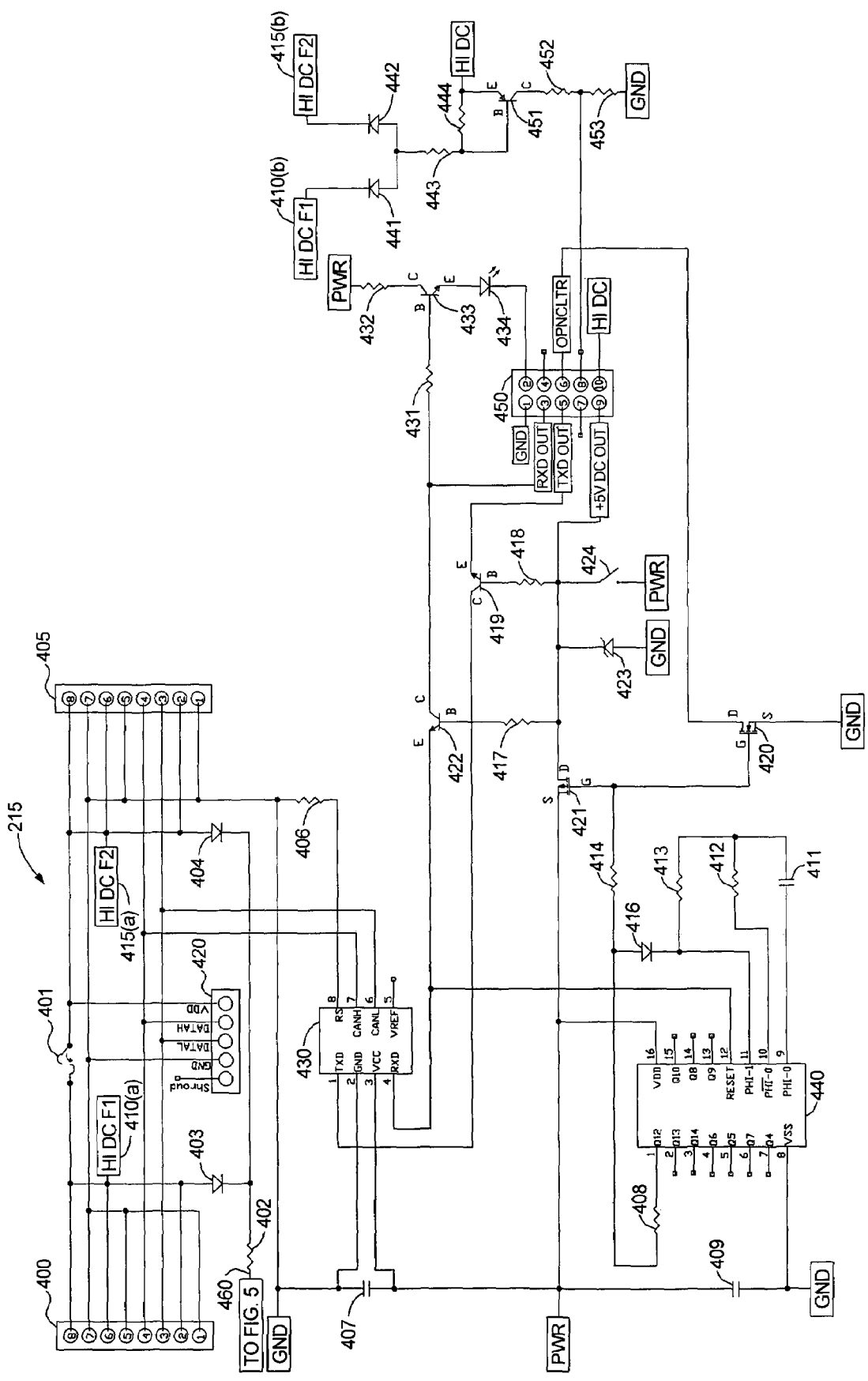
FIG. 4 is a circuit diagram showing one embodiment of a global command circuit for use with the network interfaces.

An optional connector 420 (e.g., a USB-type connector) may be linked to connectors 400, 405, as shown in the circuit diagram of FIG. 4. Connector 420 may be provided for use with a time domain reflectometry (TDR) meter for detecting the status of the lines (e.g., broken or shorted lines). This embodiment is particularly desirable during installation and subsequent troubleshooting.

It should be noted that electrical power may be provided to the device 111 according to any of a number of embodiments. In one embodiment, a high input voltage (e.g., 38 volts) may be provided over a dedicated electrical delivery system for devices on the network 120. According to such an embodiment, the high input voltage is provided to the bus tap 100 at pins 7 and 8 of network connectors 400, 405. A fuse 401 may be provided in the bus tap 100. For example, fuse 401 may be a thermal fuse (e.g., a positive temperature coefficient fuse (PTC)) that serves to reduce the occurrence of fire in the bus tap 100. The fuse opens when it exceeds a predetermined temperature and automatically closes upon cooling.

Also according to the embodiment shown in FIG. 4, network connectors 400, 405 may be provided with steering diodes 403 and 404 and resistor 402 to serve as a backup power supply. That is, if electrical power is lost at network connector 400, electrical power may still be provided via network connector 405 and vice versa.

Figure 5:
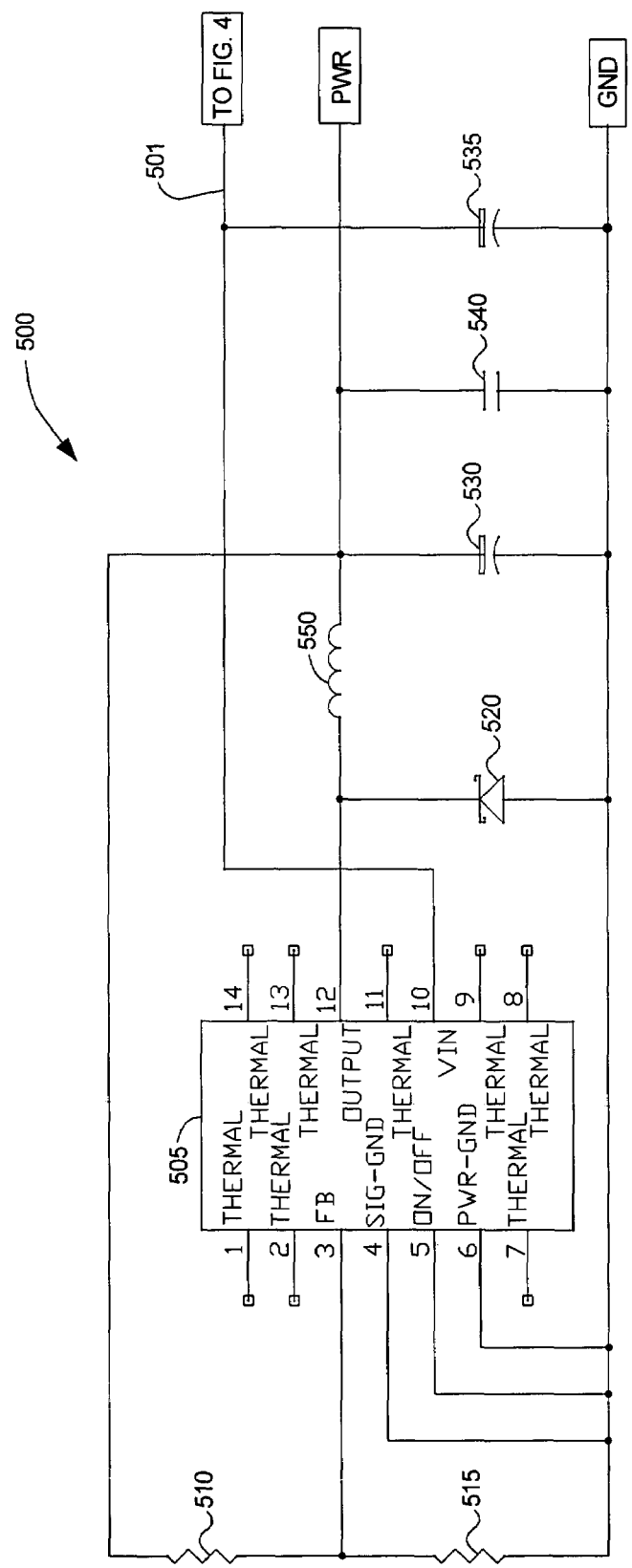
FIG. 5 is a circuit diagram showing one embodiment of a voltage regulator for use with the network interfaces.

Bus tap 100 may comprise a voltage regulator 500, such as the one shown in FIG. 5, for stepping down the voltage for use by the bus tap 100 and/or the device 110. According to this embodiment, the high input voltage via line 460 (FIG. 4) is provided via line 501 (FIG. 5) at pin 10 of the buck regulator chip 505. Buck regulator chip 505 and resistors 510, 515 step down the high input voltage to a low output voltage (e.g., +5 volts DC). The voltage regulator 500 may also comprise inductor 550, capacitors 530, 535, and 540, and diode 520 for maintaining a substantially constant output voltage.

It is noted that the invention is not limited to use with any particular voltage regulator and suitable circuitry and other embodiments can be readily provided with bus tap 100 of the present invention.

Turning our attention again to the circuit diagram shown in FIG. 4, data signals are provided from network connectors 400, 405 to transceiver 430. Transceivers 430 for use with the CAN bus are readily available, such as the PCA82C251 commercially available from Phillips Semiconductors (headquartered in Eindhoven, Netherlands, with sales offices and distributors throughout North America). The PCA82C251 is the interface between the CAN protocol controller and the physical bus, and provides differential transmit capability to the bus and differential receive capability to the CAN controller. Transceiver 430 receives network data signals (e.g., CAN bus signals) and outputs these signals at pin 4 as processor signals (e.g., Transistor Transistor Logic (TTL) signals). Transceiver 430 also receives processor signals from the device 110 at pin 1 and outputs network data signals (e.g., CAN signals).

It is noted that a slope resistor 406 may be provided for adjusting the sharpness of the signal edges (i.e., to reduce EMI). In addition, a bypass capacitor 407 may be provided to provide transceiver 430 with peak current when needed to support the high-speed capability of transceiver 430.

The transmit line connected at pin 1 of transceiver 430 is linked to the device via flying lead connector 450 (e.g., a shrouded 10-pin connector). The receive line connected at pin 4 of transceiver 430 is also linked to the device via flying lead connector 450.

Bipolar junction transistors (BJTs) 419 and 422 are provided in both the transmit line and the receive line to serve as switches. During normal operation, BJTs 419 and 422 are turned on, and data signals can be transmitted between the device 110 and the network 120. For example, during a reset function, the BJTs 419 and 422 turn off the data signals and delay delivery until the device 110 is powered on again. In addition, power is provided to processor 200 (FIG. 2) of the device 110 via pin 9 of the flying lead connector 450.

It is noted that base resistors 417, 418 may be provided to limit current to the switching transistors 419 and 422. In addition, Zener diode 423 may be provided to limit the voltage to the device 110.

According to the CAN protocol, a low signal is dominant. That is, none of the devices 110 issue signals over the CAN bus when the line is held low. As such, when power is taken away from the device 110, the transmit line of transceiver 430 (pin 1) could potentially issue a low signal over the CAN bus. This low signal would dominate the CAN bus and the CAN bus would not be able to recover. Accordingly, when the device 110 is powered off (i.e., FET 421 turns off the +5 VDC to the device 110), switches BJTs 419 and 422 are preferably also turned off to prevent a low signal from being issued over the network 120.

When the command function of the present invention is implemented as a reset signal issued over a network that uses one or more repeaters 130 (see, e.g., FIG. 1), the repeater 130 cannot reissue the reset signal to the extended network if it has first reset itself. Accordingly, a counter or timer may be provided to delay the reset function. The counter or timer allows the repeater 130 to reissue the command signal before resetting itself so that all of the devices 110 on the network receive the command signal.

According to one such embodiment, the line connected at pin 4 of transceiver 430 is linked to a timer 440. Any suitable counter or timer may be provided, such as a flip flop. In the embodiment shown in FIG. 4, timer 440 comprises a 14-stage ripple carry binary counter (part no. CD4060BCM) commercially available from Fairchild Semiconductor (Portland, Me. 04106). This timer is advanced one count on the negative transition of each clock pulse and the counters are reset to zero by a logical one at the reset input independent of the clock. Bypass capacitor 409 may be provided to provide timer 440 with high energy for periods of peak current usage.

Pins 9, 10 and 11 of timer 440 are connected to a multivibrator or free-running oscillator (integral with timer 440) and comprised of capacitor 411 and resistors 412 and 413. When the data line is held low (e.g., a logical zero) for a predetermined time, the timer will time out and send a high state through resistor 414, turning off switching element (e.g., field effect transistor (FET)) 421, turning on FET 420, and stopping timer 440 until pin 4 goes high again.

The predetermined time can be selected by connecting resistor 408 at either pin 1, pin 2, or pin 3. For example, if resistor 408 is connected to pin 1, the timer will time out after one second. If resistor 408 is connected to pin 2, the timer will time out after two seconds. If resistor 408 is connected to pin 3, the timer will time out after four seconds.

During a reset condition, the FETs 420, 421 serve two functions. FET 421 removes the +5 VDC power to the device 110 (e.g., via pin 9 of flying lead connector 450). FET 420 delivers a low signal via pins 6 and 5 of flying lead connector 450 which activates the master clear function of the processor 200. Reset may occur using just FET 420, just FET 421, or both FET 420 and 421.

An installation test circuit may be provided with the bus tap 100, and is shown according to one embodiment by the circuit connected to pin 2 of flying lead connector 450 and to pin 4 of the transceiver 430. Installation test circuit may comprise resistor 432, amplifier (BJT) 433 and light-emitting diode (LED) 434. Resistors 431, 432 may be provided to limit current on BJT 433. When a high signal (or cycling at a low rate) issues from pin 4 of the transceiver, the line between pin 1 and pin 2 of flying lead connector 450 are connected and the LED 434 lights or cycles. This provides the installer with a visual indication of the system validity (e.g., the network, power, and wiring is correct). This circuit can be removed during installation by removing the jumper between pins 1 and 2 of the flying lead connector 450 so that the LED doesn't light inside the wall during normal operation and waste system power. Pins 1 and 2 of the flying lead connector 450 may be connected again, if desired (e.g., for testing or troubleshooting).

An operational fuse fault test circuit may also be provided with the bus tap 100, and is shown according to one embodiment connected to pin 8 of flying lead connector 450. If fuse 401 is closed, the lines 410 and 415 are both high and diodes 441 and 442 are reverse biased. Resistor 444 carries a high DC signal and switching element (e.g., BJT) 451 is off (i.e., the base is pulled to emitter). If the delta voltage between lines 410 and 415 is not balanced, the fuse 401 opens and either diode 441 or diode 442 is low. BJT 451 turns on (i.e., the base is pulled toward the collector) which in turn delivers a signal via pin 8 of flying lead connector 450 to the processor 200 indicating that the fuse 401 is open. Processor 200 may report the failure via the network 120 (e.g., to network administrator 145).

It will be appreciated that the threshold delta voltage can be selected using resistors 443 and 444 (e.g., line 410 is 5 V higher than line 415). For example, if one of the connectors (e.g., 400) is providing 10 volts less than the other connector (e.g., 405), then one of the diodes 441, 442 signals that the fuse 401 is open.

Resistors 452 and 453 may be provided as a voltage divider, converting the high DC signal to an acceptable level for the processor 200 of device 110.

Of course it is understood that embodiments of the invention shown and described herein are not intended to limit the scope of the invention and are instead provided to illustrate exemplary embodiments of the invention. For example, manual switches may be provided on the various network devices 110 (e.g., at a keypad), at the bridge 140, on the network interface 101, etc. Yet other embodiments and modifications to the circuitry disclosed herein will also occur to those skilled in the art after having become familiar with the teachings of the present invention. These modifications are also intended to be within the scope of the present invention, as limited only by the prior art.

According to one embodiment of the invention, the global command feature (e.g., circuit 290) may be operated, for example, to reset at least one, and preferably all of the devices 110 on the network 120 by shutting down power to the processor 200 as follows. Network administrator 145 is instructed to, or automatically recognizes that the devices 110 should be reset. For example, a nearby lightening strike may cause one or more of the devices 110 on network 120 to malfunction and therefore the devices 110 should be reset. Accordingly, network administrator 145 issues a low signal (e.g., for several seconds) over the network 120. Although bus taps 100 recognize this low signal, this low signal stops all normal CAN bus communication.

During normal operation, FET 421 passes the +5 VDC power via pin 9 of flying lead connector 450 to the device 110. But upon receiving this low signal at pins 3 and 4 of connectors 400, 405 (FIG. 4), pin 4 of transceiver 430 goes low for several seconds and pin 12 of 440 stays low. When timer 440 times out, output at resistor 408 goes high. The high signal on diode 416 also disables the oscillator. In addition, FET 421 shuts off the +5 VDC, removing power to the device and when the transceiver 430 signal at pin 4 returns to normal, power is returned which is a power-down reset of processor 200 at the device 110.

When the lines from pins 3 and 4 at connectors 400, 405 return to a high state, timer 440 resets and outputs a low signal at resistor 408. Diode 416 shuts off and the oscillator operates again. The low signal on the gate of FET 421 turns power back on to the processor 200 at device 110.

Alternatively, the global command feature may be operated to reset the processor 200 without shutting down power to the processor 200. According to this embodiment, switch 424 is closed (e.g., hard-wired or using jumpers). As such, power is always supplied to pin 9 of flying lead connector 450. FET 420 is connected via the flying lead to the processor master clear. When the signal at resistor 408 is high, FET 420 goes low, causing the processor 200 to hot restart.

In other embodiments, switching elements provided between the transceiver and the network device 110 may be used to establish a link between the device interface 100 and the network device 110 to trigger an action or solicit a response from the network device 110. For example, the device 110 may be triggered to reset itself, to turn on an LED, to set a state of the device, to transmit information, etc.

It is readily apparent that command systems and methods of the present invention represent an important development in the field of network devices. For example, all of the network devices 110 on the network(s) can be powered down and/or reset by issuing a global command signal from the network administrator 145. Accordingly, each network device 110 does not have to be individually reset, which can be a time consuming task. Other advantages will also become readily apparent to those skilled in the art after having become familiar with the teachings of the invention.

Having herein set forth preferred embodiments of the present invention, it is expected that suitable modifications can be made thereto which will nonetheless remain within the scope of the present invention.

What is claimed is:

1. A command system for a plurality of network devices which are adapted to be one or both of communicatively and operably connected to the command system via a network, the command system comprising:
   a network administrator provided on a network, said network administrator issuing a command signal over the network;
   a plurality of device interfaces provided between the network and each of a plurality of network devices, each of the plurality of device interfaces providing for one or both of communicatively and operably connecting a respective at least one of the plurality of network devices to the network, each of said plurality of device interfaces having:
      at least one input line adapted to be one or both of communicatively and operably connected to the network and to receive the command signal over the network;
      a transceiver operatively associated with said input line, said transceiver detecting the command signal on said input line; and
      at least one switching element provided between said transceiver and the network device, said at least one switching element establishing a link to the respective network device operably or communicatively connected thereto, or both, when the command signal is detected by said transceiver;
   said plurality of device interfaces delivering an action triggering signal to the plurality of network devices in response to the command signal.

2. The command system of claim 1, wherein said at least one switching element establishes a link to the network device to reset the device.

3. The command system of claim 1, wherein said at least one switching element establishes a link to the network device for triggering an action at the device.

4. The command system of claim 1, wherein each of said plurality of device interfaces further comprises a timer circuit, said timer circuit delaying said at least one switching element from establishing the link to the network device.

5. The command system of claim 1, wherein the network comprises at least one CAN bus.

6. The command system of claim 5, wherein said command signal is a sustained low/non-CAN signal issued over the CAN bus.

7. The command system of claim 1, wherein at least one of said plurality of network devices further comprises a manually-operable switch, said manually-operable switch signaling the network device.

8. The command system of claim 1, wherein at least one of said plurality of device interfaces comprises a failure circuit, said failure circuit reporting a failure at said device interface to said network administrator.

9. The command system of claim 1, further comprising a status indicator at said network device.

10. The command system of claim 1, further comprising a device identification circuit, said device identification circuit identifying said network device to said network administrator.

* * * * *